Patented Sept. 4, 1951

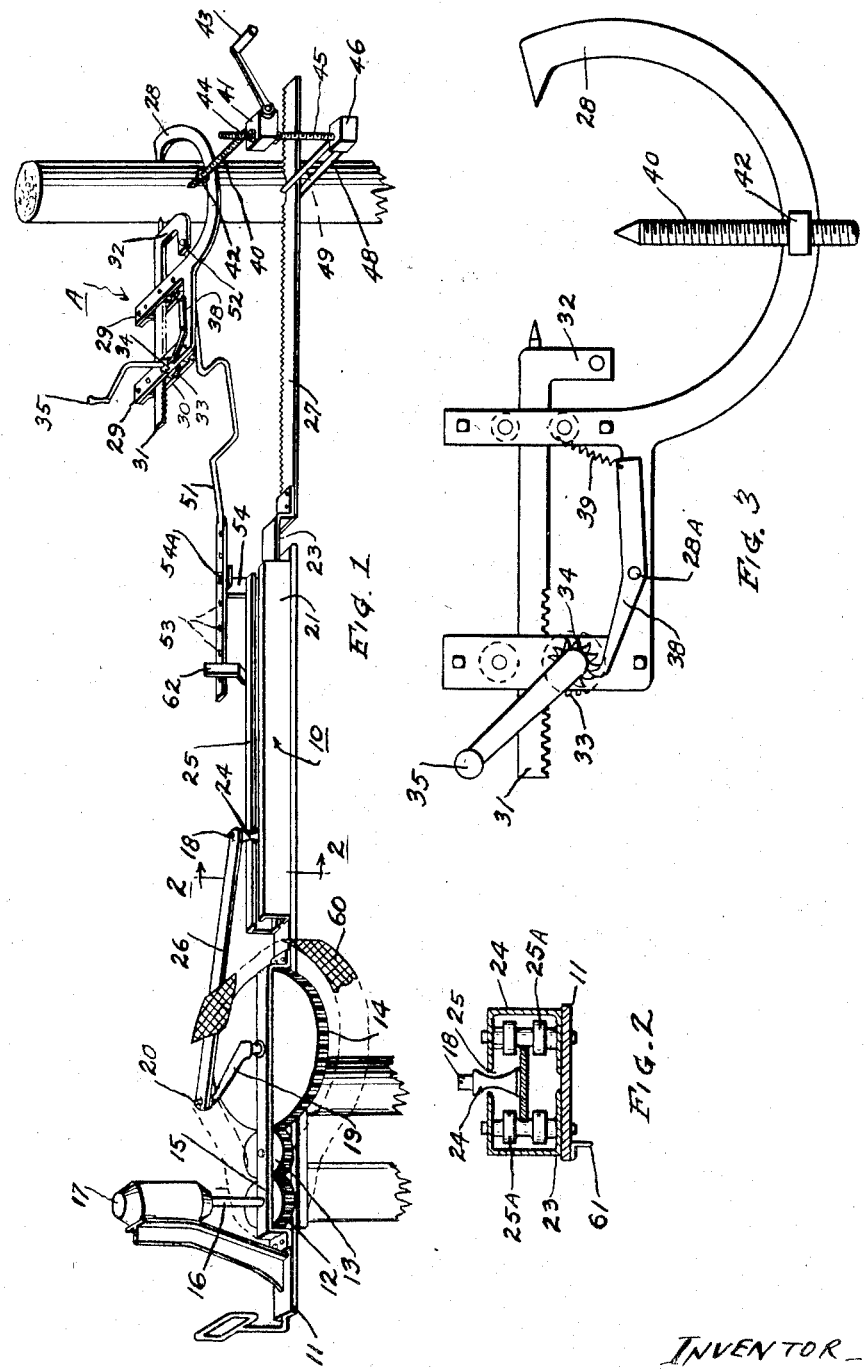

2,566,297

UNITED STATES PATENT OFFICE 2,566,297

PILE CUTTING RECIPROCATING-SAW MACHINE

Aurele Charlebois, Windsor, Ontario, Canada

Application March 30, 1946, Serial No. 658,473
In Canada June 8, 1945

1 Claim. (Cl. 143—63)

This invention relates to a device for cutting piles under water. The objects of the invention are to provide an efficient and improved pile cutting machine.

An important feature of my device is that it can be easily anchored to the pile to be cut, and can easily and expeditiously be unfastened from the pile after it has been cut.

Another feature is that the saw is automatically fed to the pile.

Another feature is that the free end of the saw can be easily adjusted so as to lie in a horizontal plane.

Still another feature is that the clamping device used for anchoring the device to the pile to be cut is capable of clamping piles of different diameters.

The device is adapted to be laid upon the top of a previously cut pile, that is, a pile which has been cut to the required height, or upon two such piles if both are suitably disposed with respect to the pile to be cut by the device. Preferably, as shown, the frame of the device is so constructed that it presents a straight or level lower face. The frame is formed to slidably receive a bar to the forward end of which is connected the adjacent end of a saw. The bar is operatively connected to a power plant, which is supported above the frame so as to be above the water, by means adapted to impart a reciprocating motion to the saw, to cut the top off a selected pile. Flexibly connected to the forward end of the frame is a rod, the forward end of which is flexibly connected to a pile clamping device. This rod is adapted to be adjustably connected to the frame so as to vary the effective distance between the pile clamping device and the frame. The clamping device is manually operated to easily and quickly fasten itself to the pile, and to unfasten itself as easily and quickly from the pile or more particularly from the top of the pile after it has been severed or cut off. The pile clamping device also carries means for supporting the loose or forward end of the saw at the desired level with respect to the underside of the frame, such means also serving to help hold the clamping device to the pile. Preferably, spring means are provided to feed the saw automatically to the pile to be cut.

In the drawings, wherein like numerals of reference indicate corresponding parts in the various figures, Figure 1 is a perspective view of a machine made in accordance with my invention, in operative position;

Figure 2 is a section on line 2—2 in Figure 1; and,

Figure 3 is an enlarged fragmentary plan view of the pile clamping device.

Referring now by numerals to the drawings, 10 is the frame. It may include a base plate or bar 11 forming a flat face or otherwise presenting a flat surface adapted to rest upon a previously cut pile, or two or more previously cut piles. Rotatably supported above the base plate are intermeshing gears 12, 13 and 14. The gears may be journalled between the base plate and a spaced, parallel bar 15 bent down at both ends to be secured to the base plate. The shaft 16 of the gear 12 is extended upwardly to be suitably coupled to a suitable power plant, which as shown, may be an electric motor 17. To the shaft of the gear 14 is fixed a crank 19 having a pin 20. The forward end of the frame is provided with guides 21 adapted to slidably receive and house an operating bar or connection 23 to which is fixed a bracket 24 having a pin 18. The guides may comprise two channels 24 spaced to provide an elongated slot 25 in which the bracket 24 is free to reciprocate. The operating bar 23 slides or operates between two grooved rollers 25A journalled in the channels, respectively. The operating bar 23 is connected to the crank 19 by means of a connecting rod 26, pivotally connected to the pins 20 and 18. A saw 27 is operatively connected to the forward end of the reciprocating member 23, the forward end of the member being so formed that the underside of the saw and the underside of the frame 10 are in substantially a same horizontal plane.

In order to locate the frame with respect to, and operatively anchor the same to the pile to be cut, there is provided a pile clamping device A, which is detachably connected to the frame. As shown, 28 is a substantially semi-circular bar or jaw formed to encompass part of the pile and to engage one side thereof. The jaw includes members 29 formed on one side with guides 30 adapted to slidably receive a member or rake 31 forming the other jaw, and having a right-angularly extending arm 32. Meshing with the rake 31 is a pinion 33 with which turns a ratchet wheel 34, both pinion and wheel being turned by a suitable handle or lever 35. Thus, the jaw 32 is actuated to engage and disengage the pile by the lever 35. The wheel 34 may be formed as shown in Figure 3. A ratchet dog 38 is pivotally mounted as at 28A, and is urged in an anti-clockwise direction by a tensioned spring 39. The operative end of the dog is formed as shown in Figure 3, to lock between adjacent teeth of the ratchet wheel notwithstanding the tension in the spring. The dog will release the wheel 34 by a slight movement of the handle 35 in a clockwise direction. When the jaw member 31 has been forced into the pile, the dog is turned against the tension in the spring 39 to engage the ratchet wheel and the handle turned slightly in an anti-clockwise direction. The clamping device will be held in operative or pile clamping position. To release the device from the pile, the handle is imparted a slight clockwise rotation.

Also forming part of the clamping device A is a pointed rod or third pile engaging member 40 which is threaded through a block or nut 42 rigid with the jaw member 28. By turning the rod, its pointed or operative end may be advanced to bite into the pile, or spaced therefrom. The outer unthreaded end of the rod is journalled in a block 41 and extends therethrough to receive a fixed crank 43. A collar 44, held to the rod as by a cotter pin (not shown) rotatably holds the rod in the block 41 between such collar and the crank 43. Threaded through the block 41 is a screw 45, the lower end of which rigidly carries a second block 46. Extending from the block 46 is a rod mounting a roller 48 and a second rod or bar 49 spaced from but parallel with the roller 48. The roller serves as a support for the free or unsupported end of the saw, and the other or upper rod serves to hold the saw down against the roller. In practice, the space between the roller and the upper rod is ¼ of an inch. The pointed screw 40 will enable one to firmly clamp piles of different diameters, and the roller 48 will serve as a gauge, to insure that the saw and the lower face of the frame 10 are in substantially a same horizontal plane. Once the clamping device A is in proper operative clamping position, with the plane of the jaw member 28 in a horizontal plane, the block 46 is lowered or raised to bring the roller 48 in a position to support the free end of the saw and the lower face of the frame 10 in a same horizontal plane. If the pointed rod 40 has to be moved appreciably toward the pile in order to engage it, in which case the roller might tend to prevent the required movement of the rod 40, the block 46 may be turned slightly to one side to present the roller 48 tangentially to the pile.

The clamping device A is attached to the frame by means of a rod 51, the forward end of which is connected to the extension 32 as at 52, and connected at the other end to a bracket 54 as by a bolt 54A. By applying a pull on the rod 51 (away from the pile) at a point between the first jaw 32 and the bolt 54A, after the clamping device A has been manually operated to release the jaws from the pile, the device may be released or moved away from the pile. The rod may be provided with spaced apertures 53 so that the effective distance between the pile clamped by the device A and the frame 10 may be adjusted or varied. Such a connection will thus permit of a rotary movement of the frame (and saw) relatively to the pile to be cut. Preferably, a suitable wire mesh guard 60 is secured to the frame, housing the gears 12, 13, 14 and crank 20. Preferably also, an angle 61 is secured to the underside of the base plate, parallelly with, and close to one longitudinal edge thereof as best shown in Figure 2. This angle will help hold the frame on the top of a cut pile, or cut piles.

In order to feed the saw automatically to the pile being cut, if desired, a spring 62 may be secured to the base and formed to engage the rear end of the rod 51 and urge the free end of the saw toward the pile.

What I claim is:

In a pile cutting machine, the combination of an elongated frame adapted to be laid upon the top of a cut pile; a saw reciprocable lengthwise of said frame and adapted to project beyond one end thereof; a pile clamping device including a jaw adapted to engage the pile to be cut on the side thereof adjacent said frame, a second jaw slidably mounted on said first jaw adapted to engage the opposite side of the pile, means for slidably moving said jaws relatively to one another to clamp and unclamp the pile, and means for releasably locking said jaws in pile-engaging position; means including a rod insertable into the pile through said second jaw for forming a sliding support for the outer portion of said saw and a support for said second jaw; and a rigid member pivotally connected between said first jaw and the forward end of said frame whereby a manual pull applied to said member transversely thereof and between its pivotal connection with said first jaw and said frame, after said locking means have been operated to release said jaws, releases said clamping device from the pile.

AURELE CHARLEBOIS.

REFERENCES CITED

The following references are of record in the file of this patent:

UNITED STATES PATENTS

| Number | Name | Date |
|---|---|---|
| 614,815 | Lane | Nov. 22, 1898 |
| 782,101 | Blaisdell | Feb. 7, 1905 |
| 925,553 | Barker | June 22, 1909 |
| 971,600 | Freese | Oct. 4, 1910 |
| 1,159,153 | Appelgate | Nov. 2, 1915 |
| 1,169,221 | Wilson | Jan. 25, 1916 |
| 1,302,932 | Lagus | May 6, 1919 |
| 1,441,747 | Perkins | Jan. 9, 1923 |
| 1,489,387 | Fosberg | Apr. 8, 1924 |
| 1,492,001 | Signalness | Apr. 29, 1924 |
| 1,505,237 | Ball | Aug. 19, 1924 |
| 1,574,001 | Rogach | Feb. 23, 1926 |
| 1,611,985 | Atwell | Dec. 28, 1926 |
| 1,854,111 | Curtis | Apr. 12, 1932 |

FOREIGN PATENTS

| Number | Country | Date |
|---|---|---|
| 58,633 | Sweden | Apr. 15, 1925 |